UNITED STATES PATENT OFFICE.

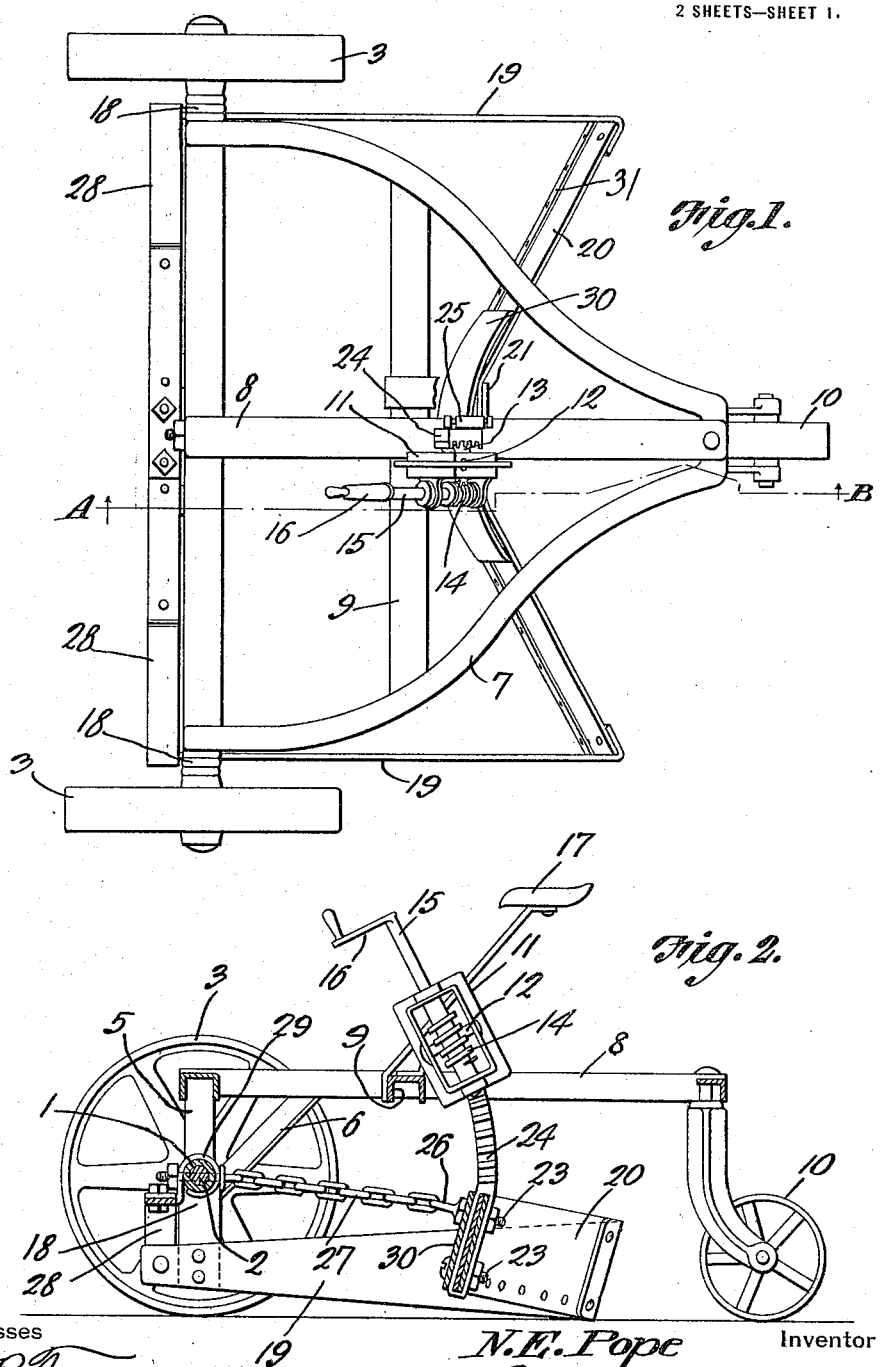

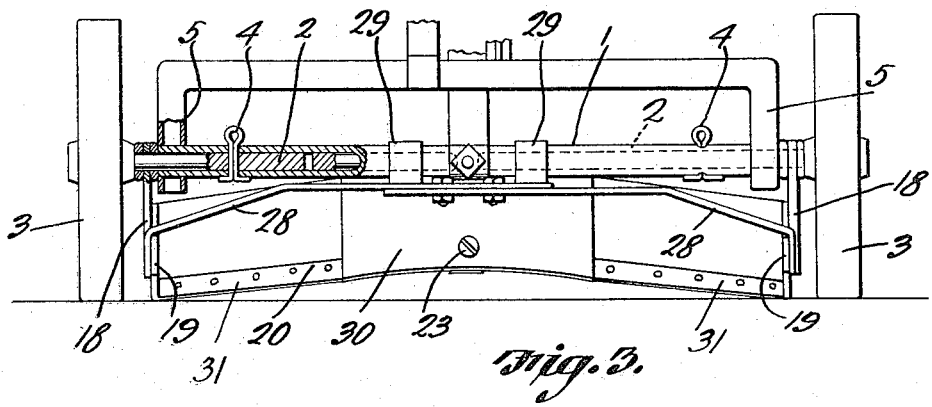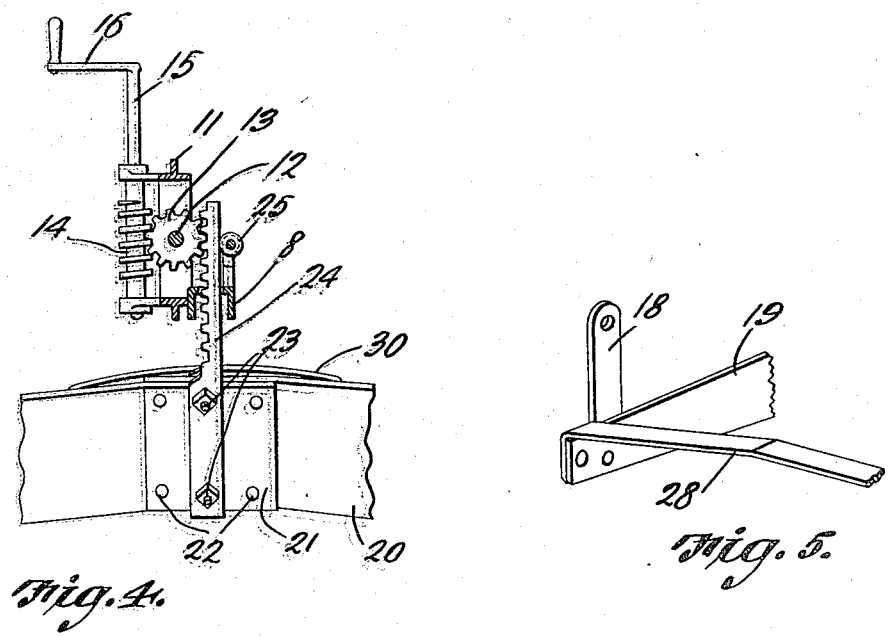

NELSONE E. POPE, OF BLOOMDALE, OHIO, ASSIGNOR OF ONE-HALF TO HARRY P. GUTHRIE, OF BLOOMDALE, OHIO.

STONE-SPREADER.

1,194,063. Specification of Letters Patent. Patented Aug. 8, 1916.

Application filed May 23, 1916. Serial No. 99,391.

*To all whom it may concern:*

Be it known that I, NELSONE E. POPE, a citizen of the United States, residing at Bloomdale, in the county of Wood and State of Ohio, have invented a new and useful Stone-Spreader, of which the following is a specification.

This invention relates to stone spreaders particularly designed for use in road building, one of the objects of the invention being to provide an apparatus which will both spread the stones and crown the road at one operation.

A further object is to provide a machine of this character which can be adjusted to different widths.

Another object is to provide a scraping blade having novel means for adjusting it upwardly and downwardly.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the machine, the seat and a portion of its support being removed. Fig. 2 is a section on line A—B Fig. 1. Fig. 3 is a front elevation, a portion of the axle being shown in section. Fig. 4 is an enlarged elevation of a portion of the scraping blade and of its shifting mechanism. Fig. 5 is a perspective view of a portion of the hitch bar.

Referring to the figures by characters of reference 1 designates a tubular axle at each end portion of which is adjustably mounted a spindle 2 engaging a supporting wheel 3, any suitable means, such as a cotter pin 4, being employed by holding the spindle 2 against longitudinal movement relative to the axle 1.

Standards 5 are mounted on the end portions of the axle 1 and are suitably reinforced, as by means of braces 6, these standards being provided at the front end of a frame 7, the sides of which converge rearwardly. A central beam 8 extends from front to rear of the frame and a transverse reinforcing beam 9 connects the sides of the frame to the beam 8. A caster 10 is provided at the rear end of the frame.

Upstanding from the beam 8 is a bracket 11 in which is journaled a shaft 12 provided with a gear 13 designed to rotate therewith. This gear is engaged by a worm 14 carried by an upwardly extending shaft 15 journaled in bracket 11 and provided, at its upper end, with suitable actuating means, such as a crank arm 16. This actuating means is within convenient reach of the occupant of a seat 17 supported in any desired manner above the beam 8.

Depending from each spindle 2 is a hanger 18 fixedly connected to the forward end of a guard blade 19 which extends rearwardly and is secured to the rear end of one section of a scraping blade 20. This scraping blade is formed of two sections which converge forwardly and which are provided, at their front ends, with lapping tongues 21 bolted or otherwise detachably connected, these tongues being preferably formed with spaced series of apertures 22 whereby it is possible to extend the bolts 23 through different sets of apertures and thus adjust the scraping blade to different lengths. Bolts 23 may be used for fastening to the scraping blade an upstanding rack 24 which engages gear 13. This rack is slidably mounted in the beam 8 and has a roller 25 constituting a backing therefor to prevent the rack from swinging away from engagement with the gear 13.

One of the bolts 23 has an eye 26 extending forwardly therefrom and this eye is connected to the middle portion of the axle 1 by a chain 27, thus acting as a reinforce to prevent the scraping blade from buckling at the center while in use.

It will be understood that by rotating shaft 15, the rack 24 can be raised or lowered, thus causing the scraping blade to swing upwardly or downwardly as desired, the hangers 18 swinging about the spindles 2 during this adjustment. As the machine is drawn forward the stones will be collected between the guard blades 19 and in front the scraping blade and as the middle portion of the scraping blade is higher than the end portions thereof it will be seen that the stones gathered in front of the scraping blade will be drawn along the ground and gradually released at the center of the scraping blade, thereby crowning the road.

A hitch bar 28 is arranged in front of the axle and consists of two adjustably connected lapping sections each of which has a bracket 29 secured to the middle portion of the axle 1. The end portions of the sections are inclined downwardly and outwardly and are secured to the front ends of the guard blades 19. Thus the hitch bar can be lengthened or shortened when the width of the machine is increased or diminished.

It will be noted that where the sections of the scraping blade come together, an arched wear plate 30 is arranged in front thereof, the same being secured in place by the bolts 23.

Wear plates 31 can be arranged along the front faces of the scraping blades as shown.

What is claimed is:—

1. A stone spreader including a tubular axle, wheel engaging spindles adjustable longitudinally within the end portions of the axle, a frame supported by the axle, rearwardly extending guard blades connected to the respective spindles, a scraping blade comprising forwardly converging sections secured to the respective guard blades, said sections being adjustably connected to each other, and means for raising and lowering the scraping and guard blades relative to the frame.

2. A stone spreader including a tubular axle, wheel engaging spindles adjustable longitudinally within the end portions of the axle, a frame supported by the axle, rearwardly extending guard blades connected to the respective spindles, a scraping blade comprising forwardly converging sections secured to the respective guard blades, said sections being adjustably connected to each other, an arcuate wear member extending across the front faces of the lapping portions of the members of the scraping blade, a reinforcing connection between the central portion of the scraping blade and the axle, and means for raising and lowering the scraping blade.

3. A stone spreader including an extensible wheel supported axle, a frame supported thereby, a scraping blade including adjustably connected rearwardly diverging portions, guard blades fixedly connected to the outer ends of said portions and mounted to swing about the axle, and means for raising and lowering the scraping blade and the guard blades attached thereto.

4. A stone spreader including an extensible wheel supported axle, a frame supported thereby, a scraping blade including adjustably connected rearwardly diverging portions, guard blades fixedly connected to the outer ends of said portions and mounted to swing about the axle, and means for raising and lowering the scraping blade and the guard blades attached thereto, the middle portion of the scraping blade being higher than the end portions thereof.

5. A stone spreader including an extensible wheel supported axle, a frame supported thereby, a scraping blade including adjustably connected rearwardly diverging portions, guard blades fixedly connected to the outer ends of said portions and mounted to swing about the axle, means for raising and lowering the scraping blade and the guard blades attached thereto, the middle portion of the scraping blade being higher than the end portions thereof, and an arcuate wear member in front of and detachably secured to the middle portion of the scraping blade.

6. A stone spreader including an extensible wheel supported axle, a frame mounted thereon, a supporting caster connected to the frame, guard blades pivotally connected to and extending rearwardly from the axle, a scraping blade secured at its ends to the guard blades and including adjustably connected forwardly converging portions, the forward portion of the scraping blade being higher than the end portions thereof, and an arcuate wear member detachably secured to and in front of the middle portion of the scraping blade.

7. In a stone spreader, a wheel supported axle, a frame mounted thereon, guard blades connected to and adapted to swing about the axle, a scraping blade having its end portions secured to the guard blades and consisting of opposed forwardly converging members adjustably connected, a rack bar secured to the scraping blade, a gear meshing therewith, and an actuating worm engaging said gear.

In testimony that I claim the foregoing as my own, I have hereto affixed my signature in the presence of two witnesses.

NELSONE E. POPE.

Witnesses:
WILLIAM BYRUM,
WALTER M. WITHERSPOON.

Copies of this patent may be obtained for five cents each, by addressing the "Commissioner of Patents, Washington, D. C."